(12) United States Patent
Kitayama et al.

(10) Patent No.: US 7,748,975 B2
(45) Date of Patent: Jul. 6, 2010

(54) MOLDING DIE

(75) Inventors: Kenji Kitayama, Hyogo (JP); Nobuyuki Ohji, Hyogo (JP); Shogo Tomiyama, Hyogo (JP)

(73) Assignee: Daicel Chemical Industries, Ltd., Osaka-Shi (JP)

( * ) Notice: Subject to any disclaimer, the term of this patent is extended or adjusted under 35 U.S.C. 154(b) by 299 days.

(21) Appl. No.: 11/889,589

(22) Filed: Aug. 15, 2007

(65) Prior Publication Data

US 2008/0048356 A1   Feb. 28, 2008

(30) Foreign Application Priority Data

Aug. 28, 2006   (JP) .............................. 2006-230325

(51) Int. Cl.
   B29C 45/02  (2006.01)
   B29C 45/03  (2006.01)
   D01D 5/24   (2006.01)

(52) U.S. Cl. ................. 425/577; 264/209.1; 264/209.8; 425/381

(58) Field of Classification Search .............. 264/209.8; 425/79, 577, 381
See application file for complete search history.

(56) References Cited

U.S. PATENT DOCUMENTS

| | | | | |
|---|---|---|---|---|
| 2,952,876 A * | 9/1960 | Miles | ......................... | 425/309 |
| 4,036,930 A * | 7/1977 | Murai et al. | .................. | 264/167 |
| 4,240,782 A * | 12/1980 | McPhee et al. | ............. | 425/467 |
| 4,599,214 A | 7/1986 | Luton | | |
| 4,601,650 A | 7/1986 | Luton | | |
| 4,774,749 A * | 10/1988 | Furumura | .............. | 29/898.055 |
| 5,061,163 A * | 10/1991 | Kennedy | ..................... | 425/79 |
| 5,461,898 A * | 10/1995 | Lessen | ........................ | 72/256 |
| 5,674,440 A * | 10/1997 | Klinedinst | ................. | 264/40.5 |
| 6,840,756 B2 * | 1/2005 | Coel et al. | .................. | 425/556 |
| 7,329,113 B2 * | 2/2008 | Leseman | .................... | 425/381 |
| 2003/0030162 A1 | 2/2003 | Yamamoto et al. | | |
| 2003/0222369 A1 * | 12/2003 | Nicora et al. | .............. | 264/40.5 |

FOREIGN PATENT DOCUMENTS

| | | |
|---|---|---|
| JP | 62-83406 A | 4/1987 |
| JP | 2000-094198 A | 4/2000 |
| JP | 2001-342091 A | 12/2001 |
| JP | 2002-031273 A | 1/2002 |

* cited by examiner

*Primary Examiner*—Joseph S Del Sole
*Assistant Examiner*—Kimberly A Stewart
(74) *Attorney, Agent, or Firm*—Birch, Stewart, Kolasch & Birch, LLP

(57) ABSTRACT

The present invention relates to a molding die for molding a hollow molding article, including:
   a pin plate having an inflow port for molding material, a tubular bushing forming a molding path continued from the inflow port, an outlet of the die positioned in the extending direction of the molding path, a conical pin provided perpendicularly to the pin plate and disposed inside the molding path,
   a gap, that is continuous in the longitudinal direction, being provided between an inner wall surface of the molding path and an outer surface of the conical pin,
   an adjusting device for adjusting a width of a standard annular gap when a gap formed between a specified position in the longitudinal direction of the molding path and the outer surface of the conical pin opposing to the position.

7 Claims, 4 Drawing Sheets

MOLDING DIE

This nonprovisional application claims priority under 35 U.S.C. §119(a) on Patent Application No. 2006-230325 filed in Japan on 28 Aug. 2006, which is incorporated by reference.

BACKGROUND OF INVENTION

1. Field of Invention

The present invention relates to a molding die for use attached to an outlet of an extrusion-molding molding machine or such, and further relates to a method of molding a hollow molded article having a through-hole using such molding die.

2. Description of Related Art

There are various shapes of gas generating agents used in airbag apparatuses mounted in motor vehicles, and for example, cylindrical gas generating agents having a through-hole disclosed in JP-A No. 62-83406, JP-A No. 2002-31273 and JP-A No. 2000-94198 are known.

For the manufacturing of a cylindrical gas generating agent having a through-hole, a method of extrusion-molding by an attached die (base) 50, such as that shown in FIG. 8, to an outlet of an extrusion-molding molding machine, is employed.

The die 50 shown in FIG. 8 includes a pin plate 51 for connecting to the outlet of the extrusion-molding molding machine, a pin 52 attached perpendicularly to the surface of the pin plate 51, and a thick tubular bushing 53. The pin plate 51 has a material inflow port 54. The pin 52 is a rod-shaped pin of uniform diameter, and is disposed axially inside a material molding path 55 formed by the bushing 53. An outlet 56 of the die is provided in the extending-direction of the molding path 55.

Material which flows in from the inflow port 54 is, due to the existence of the pin 52, in the process of passing through the molding path 55 and being extruded from the outlet 56 of the die, extruded in the form of a string-shape or a rod-shape, having a through-hole with an inner diameter identical to that of the outer diameter of the pin 52. Furthermore, the string-shaped or rod-shaped molded article is cut at a desired length and a gas generating agent is obtained.

SUMMARY OF INVENTION

The present invention relates to a molding die for molding a hollow molding article, including:
- a pin plate having an inflow port for molding material, a tubular bushing forming a molding path continued from the inflow port, an outlet of the die positioned in the extending direction of the molding path, a conical pin provided perpendicularly to the pin plate and disposed inside the molding path,
- a gap, that is continuous in the longitudinal direction, being provided between an inner wall surface of the molding path and an outer surface of the conical pin,
- an adjusting device for adjusting a width of a standard annular gap when a gap formed between a specified position (controlling position) in the longitudinal direction of the molding path and the outer surface of the conical pin opposing to the position.

The present invention also relates to a method of molding a hollow molding article, using the molding die of the invention, including a step of adjusting a width of the standard annular gap to obtain a hollow molding article having a through-hole of a desired diameter.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION OF INVENTION

Figure 1:
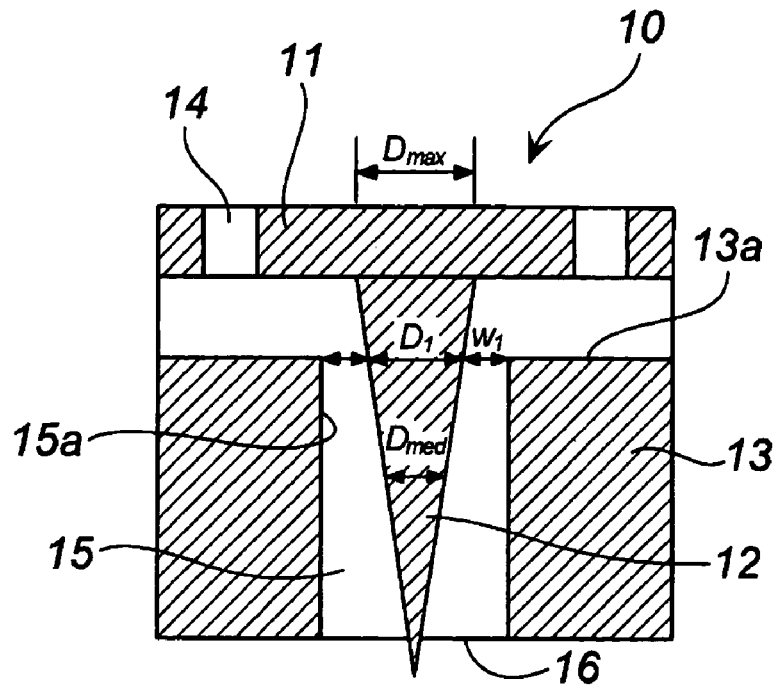
FIG. 1 shows a longitudinal sectional view of a molding die.

When manufacturing a gas generating agent having a through-hole, as it is necessary to use a die having a pin of the desired diameter in order to adjust the diameter of the through-hole to a desired diameter, a plurality of dies or a plurality of spare pins need to be prepared. Moreover, when molding an agent having a through-hole of a small diameter (for example, a diameter of approximately 1.0 mm), it is also necessary to use a pin 52 having a small diameter. However, this is problematic as the manufacturing of a pin 54 having a small diameter itself is challenging, and as such pins easily break under pressure added during molding.

The present invention relates to a highly durable molding die which can produce a hollow molded article with a through-hole having a variety of diameters by way of only a single molding die.

In addition the present invention relates to a highly durable molding die which can produce hollow molded articles with through-holes having changed diameters, respectively, by way of only a single molding die.

The present invention relates to a method of molding various types of hollow molded articles having through-holes, using such a molding die.

As a conical pin may be made stronger and more durable than a cylindrical pin, pin breakage during molding is suppressed.

Moreover, by adjusting the width of the standard annular gap to a desired width with a device for adjusting the width of the standard annular gap, the diameter of the conical pin corresponding to the standard annular gap (hereafter "standard diameter") can be adjusted to a desired one. Therefore, when the molding material flows through the gap between the inner wall of the molding path and the outer surface of the conical pin and is extruded, a hollow molded article having a through-hole of a diameter corresponding to the desired size of the standard diameter is obtained.

As a device for adjusting the width of the standard annular gap, a device for making the conical pin axially movable, a device for making the tubular bushing axially movable, or combined above two devices, may be employed. In other words, the present invention further relates to the molding die, wherein the device for adjusting the width of the standard annular gap is at least one of the device for making the conical pin axially movable and the device for making the tubular bushing axially movable.

It is preferable that the ratio (Dmed/Dmax) of the maximum outer diameter (Dmax) of the conical pin and the outer diameter at a position at half the length (Dmed) of the conical pin be 0.01 to 1.00, and more preferable is a ratio of 0.1 to 0.8.

By setting the Dmed/Dmax ratio in this range, the durability of the pin may be increased. Maximum outer diameter is the diameter of the bottom surface of the conical pin. In other words, the present invention further relates to the molding die, wherein the ratio (Dmed/Dmax) of the maximum outer diameter (Dmax) of the conical pin and the outer diameter at a position at half the length (Dmed) of the conical pin is 0.01 to 1.00.

By adjusting the width of the standard annular gap with the above described molding die and by, a hollow molded article having a through-hole of a desired diameter can be obtained.

A hollow molded article obtained by employing the molding method of the present invention, may be a rod-shaped, a string-shaped or a thread-shaped molded article having a through-hole, and according to the intended end-use, an inner diameter, outer diameter, length and so on may be appropriately designed. In other words, the present invention further relates to the method of molding a hollow molding article, the hollow molded article is a rod-shaped, a string-shaped or a thread-shaped molded article having a through-hole.

Preferably, the present invention further relates to the method of molding a hollow molding article, wherein the hollow molded article is a molded article of gas generating agent which is cylindrical in shape and has a through-hole.

The molding method of the present invention may be employed in manufacture of gas generating agent, food processing, resin processing, manufacture of hollow fiber and so on, however, it is particularly suitable as a method for manufacturing cylindrical gas generating agent molded articles having through-holes using the molding die connected to an outlet of an extrusion-molding molding machine.

The molding die of the present invention, is highly durable, and using only a single die it is possible to manufacture hollow molded articles having various through-holes.

Embodiment of Invention

<Molding Die—1>

Figure 2:
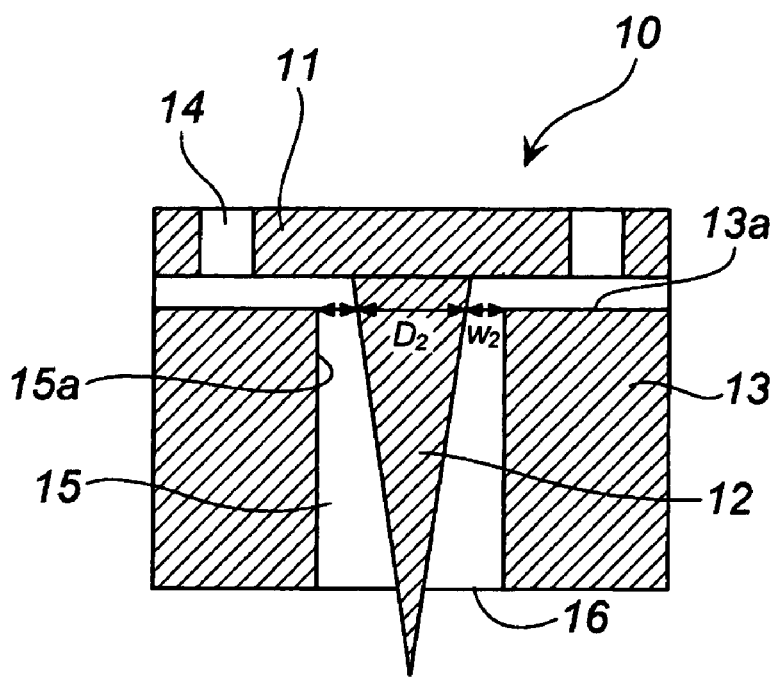
FIG. 2 shows a longitudinal sectional view of the molding die of FIG. 1 in which the position of the pin is altered.
Figure 3:
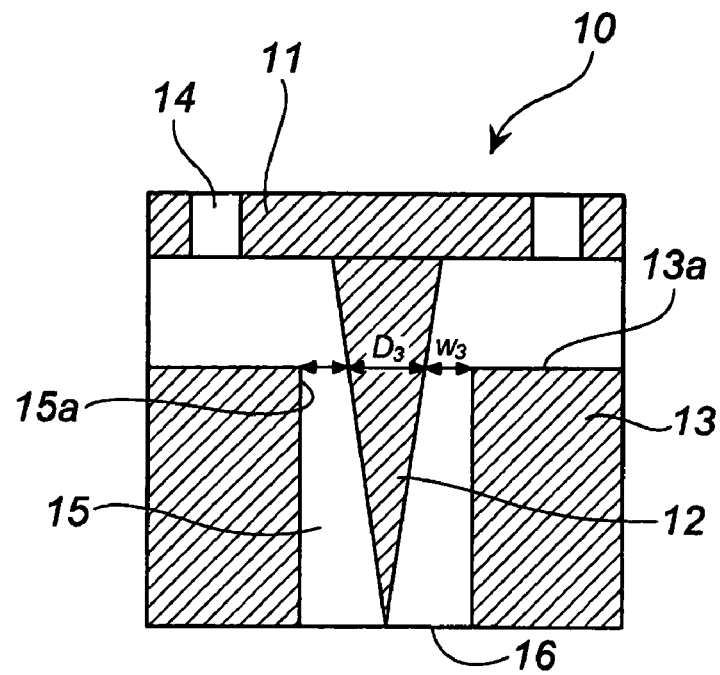
FIG. 3 shows a longitudinal sectional view of the molding die of FIG. 1 in which the position of the pin is further altered.
Figure 4:
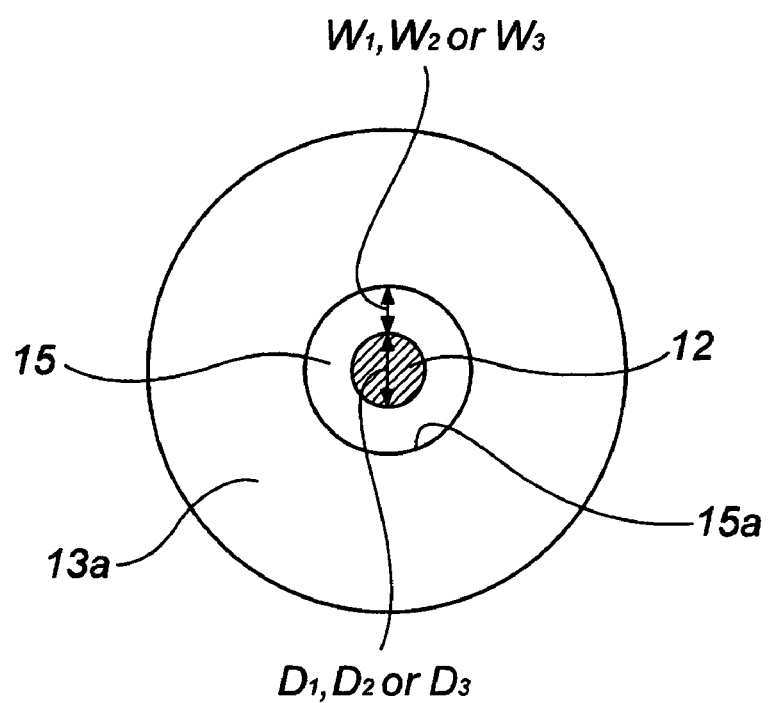
FIG. 4 shows a transverse sectional view of any of FIGS. 1 to 3.

With reference to FIGS. 1 to 4, one embodiment of the molding die will be explained. FIGS. 1 to 3 are all longitudinal sectional views of the molding die, showing various axial positions of the conical pin. FIG. 4 shows a common cross-sectional view in the widthwise direction of FIGS. 1 to 3 (note, this is an aspect in which only the pin 12 is a cross-sectional view, the view of the bushing 13 is not cross-sectional, however an end surface 13a is showing), however the pin plate 11 is omitted. The molding die 10 of FIGS. 1 to 4 is connected to an outlet of an extrusion-molding molding machine or an extrusion-molding molding machine, and is appropriate for use in gas generating agent molding, food processing, resin processing, and so on.

The molding die 10 has a circular disk-shaped pin plate 11 having an inflow port 14 for molding material, and a thick tubular bushing 13.

The inflow port 14 on the pin plate 11 is annular. The pin plate 11 is fixed and connected directly, or via an adaptor, to a supply port for fluid molding material, for example, an outlet of an extrusion-molding molding machine or an outlet of an extruder, and when this is the case, the outlet of the extrusion-molding molding machine or the outlet of the extruder are in communication with the inflow port 14.

The inside of the tubular busing 13 is a molding path 15, which the molding material passes through, and an outlet 16 of the die is provided in the extending-direction of the molding path 15.

In the pin plate 11, a conical pin 12 is attached perpendicularly to the central portion therein (in the annular inflow port 14), and the pin 12 extends axially inside the molding path 15. The ratio (Dmed/Dmax) of the bottom surface outer diameter (Dmax) of the pin 12 and the outer diameter at a position at half the length (Dmed) of the pin 12 is about 0.5.

As the central axis of the pin 12 and the central axis of the molding path 15 coincide with each other, a gap continuing in the length-wise direction is formed between an inner wall surface 15a of the molding path 15 (inner wall surface of the bushing 13) and the outer surface of the conical pin 12.

The gap is a space portion which is not occupied by the pin 12 inside the molding path 15, and is a gap (hereafter referred to as "molding gap") through which the molding material passes, thus contributing to molding. Note, the space between the pin plate 11 and the end surface 13a of the bushing 13 does not directly contribute to molding since the molded material which flows in from the inflow port 14 simply passes therethrough.

The molding die 10 is formed such that at least one of, or both the pin 12 and the bushing 13 are axially movable. The device for making these movable are not restricted, and for example, the device shown in FIG. 5 and FIG. 6 may be employed.

Figure 5:
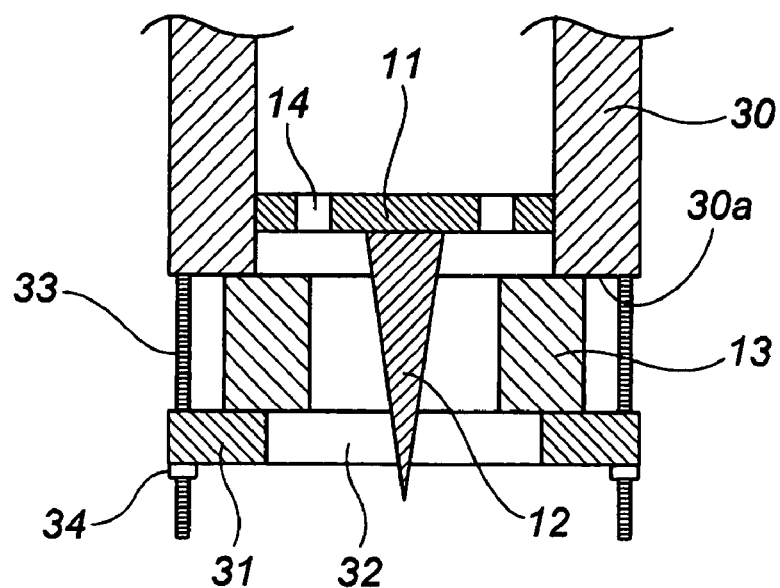
FIG. 5 shows an explanatory diagram of a method of use of the molding die of FIGS. 1 to 3.

FIG. 5 shows the device for changing the relative position of the pin 12 and the bushing 13 by altering the thickness of the bushing 13. The pin plate 11 is fixed near an opening portion of a tubular adaptor 30 attached to the outlet of the extrusion-molding molding machine. Also, the bushing 13 having the desired thickness is fixed by a screw 33 and a nut 34 in between an annular holder 31, which has an opening 32 in the central portion, and the circumferential edge of the opening portion 30a.

When changing the relative position of the pin 12 and the bushing 13, a method in which the screw 33 and the nut 34 are loosened to remove the bushing 13, and replace it with a thicker or a thinner bushing, may be employed. Alternatively, by forming the bushing 13 from a combination of thin washers, a method for increasing or decreasing the number of washers may be employed.

Figure 6:
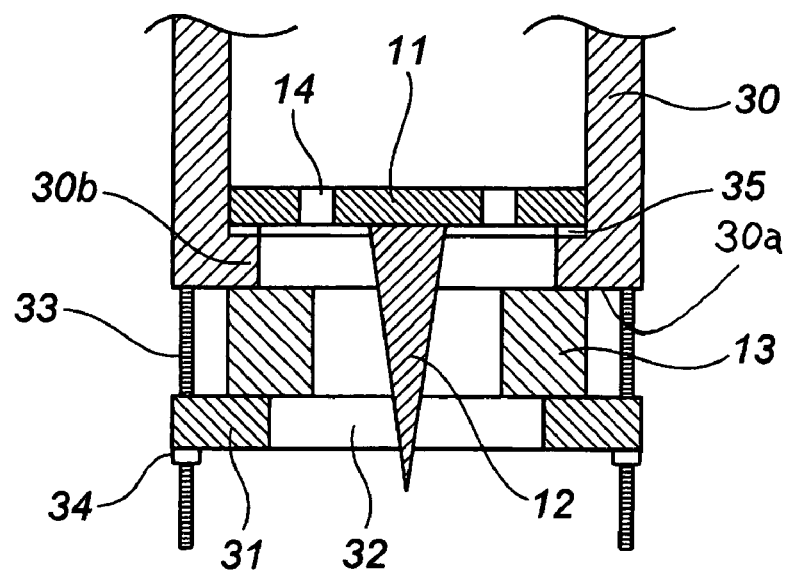
FIG. 6 shows an explanatory diagram of a method of use of another embodiment of the molding die of FIGS. 1 to 3.

FIG. 6 shows the device for changing the relative position of the pin 12 and the bushing 13 by altering the position of the pin plate 11 in the axial direction. As the drawing shows, the opening portion of the tubular adaptor 30 attached to the outlet of the extrusion-molding molding machine has an inward flange portion 30b, and the pin plate 11 is disposed on an inner wall surface of the inward flange portion 30b. Also, a washer 35 is held in between the pin plate 11 and the inward-facing flange portion 30b. The bushing 13 is fixed by the screw 33 and the nut 34 in between the annular holder 31, which has the opening 32 in the central portion, and the circumferential edge 30a of the opening portion.

When changing the relative position of the pin 12 and the bushing 13, a method of increasing or decreasing the number of washers 35 held in between the pin plate 11 and the inner wall surface of the inward flange portion 30b, may be employed.

By changing the relative position of the pin 12 and the bushing 13, as shown in FIGS. 1 to 3, the width ($w_1$, $w_2$, and $w_3$ shown in FIGS. 1 to 4) of the standard annular gap formed between the inner wall surface 15a of the molding path and the outer surface of the pin 12 at the entrance portion of the molding path 15 (the opening opposite to the outlet 16 of the die) may be altered, such that the diameters, $D_1$, $D_2$, and $D_3$ (standard annular diameter) of the pin 12 corresponding to $w_1$, $w_2$, and $w_3$ may be altered.

As shown in FIG. 4, the width of the standard annular gap is the space between the outer surface of pin 12 and the molding path inner wall surface 15a in a cross-section in which the pin 12 is cut at the same plane as the bushing end surface 13a. The size relationship of the widths of the standard annular gap in FIGS. 1 to 3 is, $w_3 > w_1 > w_2$, and the size relationship of the standard diameters of the pin 12 corresponding thereto (see FIG. 4) is $D_2 > D_1 > D_3$ at the standard annular gaps.

<Molding Die—2>

Figure 7:
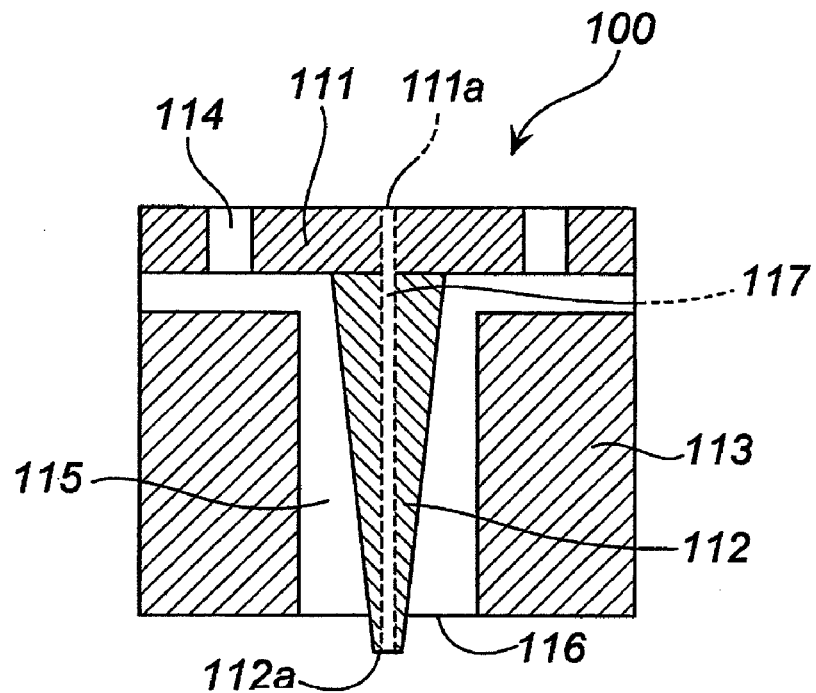
FIG. 7 shows a longitudinal sectional view of an embodiment of a molding die different from the molding die of FIGS. 1 to 3.

Using FIG. 7, another embodiment of the molding die will be explained. FIG. 7 is a longitudinal sectional view of a molding die 100. The molding die 100 of FIG. 7 is appropriate for hollow fiber molding.

The basic configuration and function of the molding die 100 are identical to those of the molding die 10 except for some differences, and the molding die 100 has a pin plate 111, a conical pin 112, a thick tubular bushing 113, an inflow port 114, a molding path 115, and an outlet 116 of the die.

The distal end 112a of the pin 112 is, unlike the pin 12 of FIGS. 1 to 3, not pointed, but formed from a flat surface. Inside the pin 112 a path 117 for liquid or gas is formed running through the axial direction. The end of the path 117 for liquid or gas in the distal end 112a side, is opened, and the opposite side end is connected to a through-hole 111a in the thickness direction formed in the central portion of the pin plate 111.

When the molding die 100 shown in FIG. 7 is used to mold hollow fiber, the inflow port 114 is an inflow port for a fiber forming solution, and the path 117 for liquid or gas, is a path for congealed liquid (for example, water) or congealed gas (for example, air).

<Hollow Molded Article Molding Method>

Next, a method of molding a molded article of gas generating agent having a through-hole in the lengthwise direction by attaching the molding die 10 shown in FIGS. 1 to 4 to an outlet of a known biaxial kneading extrusion-molding molding machine, will be explained. Please note, in the manufacturing of this molded article of gas generating agent, in regards to various manufacturing conditions, apart from the molding die 10 of the present invention, manufacturing conditions of known gas generating agent manufacturing methods (for example, JP-A No. 2001-342091) may be applied.

Molding materials for the gas generating agent, including the respective desired amounts of fuel, oxidizing agent, binder and necessary additives, and ion exchange water, are dropped through the material slot of the biaxial kneading extrusion-molding molding machine, and kneaded.

Next, the kneaded composition inside the biaxial kneading extrusion-molding molding machine passes through the outlet of the extrusion-molding molding machine and is extruded through the molding die 10. The axial position of the pin 12 and the bushing 13 of the molding die 10 are adjusted in advance, so that at this time the through-hole of the hollow molded article is formed with the desired diameter (for example, with any of FIGS. 1 to 3).

The molding material extruded from the outlet of the extrusion-molding molding machine is, after flowing through the inflow port 14, passed through the molding path 15 and extruded in a strand shape from the outlet 16 of the die. In this process, for example, when the pin 12 and the bushing 13 are in the positions shown in FIG. 1, a strand having a through-hole corresponding to $D_1$ (for example, about 1 to 10 mm) is extruded.

Next, the extruded strand is cut at the desired length and a single-hole cylindrical gas generating agent is obtained. Afterwards, by drying and sieving, a gas generating agent molded article as a final product can be obtained.

In the molding method of the present invention, as by the device of adjusting the axial relative position of the pin 12 and the bushing 13 in the molding die 10, the size of the through-hole of the gas generating agent to be obtained may be adjusted, gas generating agents of varying through-hole diameter may be manufactured with only one molding die 10.

Figure 8:
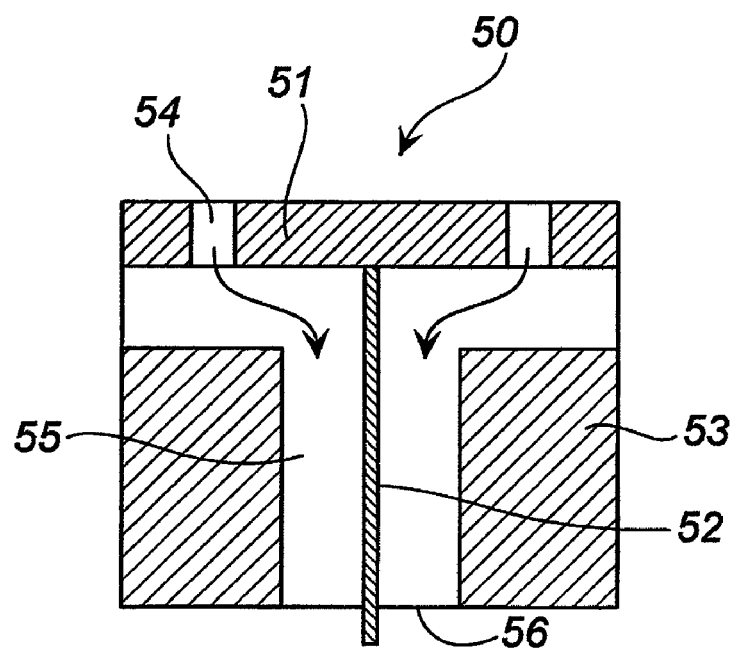
FIG. 8 shows a longitudinal sectional view of a molding die of conventional technology.

In the molding method of the present invention, because the pin 12 of the molding die 10 is a conical shape, compared to a pin 52 of a conventional molding die 50, such as that shown in FIG. 8, it is more durable and even when pressured during molding is less likely to break. When a pin does break, there is a possible risk of the gas generating agent to be ignited due to the impact of the break, however, when using the molding die, 10 this kind of danger is eliminated.

In the molding method of the present invention, because the pin 12 of the molding die 10 is a conical shape, when compared to the pin 52 of the conventional molding die 50 shown in FIG. 8, the difference in the frictional power generated, when the molding material comes into contact with the pin 12, and the frictional power generated when the molding material comes into contact with the bushing 13, is smaller, and thus the surface of the obtained gas generating agent molded article is smooth.

EXAMPLE

A molding die 10 was attached to an extruding outlet (outer diameter 14.0 mm) of a biaxial kneading extrusion-molding molding machine in the manner known in FIG. 1.

Guanidine nitrate 36.8 mass %, basic copper nitrate 44.0 mass %, guar gum 2.5 mass % and ion-exchanged water (electrical conductivity of 1 µS/cm) 16.7 mass %, was dropped in through a material slot of the biaxial kneading extrusion-molding molding machine, and kneaded. Kneading took place at 80° C. over a kneading time (holding time) of two minutes.

Afterwards, the material was extruded from an outlet 16 of the molding die 10 in a strand shape and cut such that a single-perforated cylindrical gas generating agent (outer diameter 2.4 mm, inner diameter 0.7 mm, length 4.0 mm) was obtained.

Next, this gas generating agent was placed in a drying machine, held at 30° C. and preliminarily dried, then was further dried at 80° C., and after the loss on heat was below or equal to 0.3 mass %, was sieved and an end product was obtained.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A molding die for molding a hollow molding article, comprising:
   a pin plate having an inflow port for molding material;
   a tubular bushing forming a molding path continued from the inflow port and having an entrance portion;
   an outlet of the die positioned in the extending direction of the molding path and opposite to the entrance portion;

a conical pin provided perpendicularly to the pin plate and disposed inside the molding path, the conical pin including a distal end, a bottom surface, and a continuously varying outer diameter from the distal end to the bottom surface;

a gap, that is continuous in a longitudinal direction, being provided between an inner wall surface of the molding path and an outer surface of the conical pin, an inner circumference of the entrance portion and the outer surface of the conical pin forming a standard annular gap which is smaller than an exit gap defined between an inner circumference of the outlet and the outer surface of the conical pin; and an adjusting device for adjusting a width of the standard annular gap.

2. The molding die according to claim 1, wherein the device for adjusting the width of the standard annular gap is at least one of the device for making the conical pin axially movable and the device for making the tubular bushing axially movable.

3. The molding die according to claim 1, wherein the ratio (Dmed/Dmax) of the maximum outer diameter (Dmax) of the conical pin and the outer diameter at a position at half the length (Dmed) of the conical pin is 0.01 to 1.00.

4. The molding die according to claim 2, wherein the ratio (Dmed/Dmax) of the maximum outer diameter (Dmax) of the conical pin and the outer diameter at a position at half the length (Dmed) of the conical pin is 0.01 to 1.00.

5. A method of molding a hollow molding article, using a molding die, the molding die comprising:

a pin plate having an inflow port for molding material;

a tubular bushing forming a molding path continued from the inflow port and having an entrance portion;

an outlet of the die positioned in the extending direction of the molding path and opposite to the entrance portion;

a conical pin provided perpendicularly to the pin plate and disposed inside the molding path, the conical pin including a distal end, a bottom surface, and a continuously varying outer diameter from the distal end to the bottom surface;

a gap, that is continuous in a longitudinal direction, being provided between an inner wall surface of the molding path and an outer surface of the conical pin, an inner circumference of the entrance portion and the outer surface of the conical pin forming a standard annular gap which is smaller than an exit gap defined between an inner circumference of the outlet and the outer surface of the conical pin; and an adjusting device for adjusting a width of the standard annular gap, wherein the method including a step of adjusting the width of the standard annular gap to obtain the hollow molding article having a through-hole of a desired diameter.

6. The method of molding a hollow molding article according to claim 5, wherein the hollow molded article is a rod-shaped, a string-shaped or a thread-shaped molded article having the through-hole.

7. The method of molding a hollow molding article according to claim 5, wherein the hollow molded article is a molded article of gas generating agent which is cylindrical in shape and has the through-hole.

* * * * *